May 15, 1951     H. HAIDEGGER     2,553,086
INSTRUMENT FOR INSIDE MEASUREMENTS
Filed Nov. 14, 1947     2 Sheets-Sheet 1

Inventor:
Hans Haidegger

May 15, 1951        H. HAIDEGGER        2,553,086
INSTRUMENT FOR INSIDE MEASUREMENTS
Filed Nov. 14, 1947        2 Sheets-Sheet 2
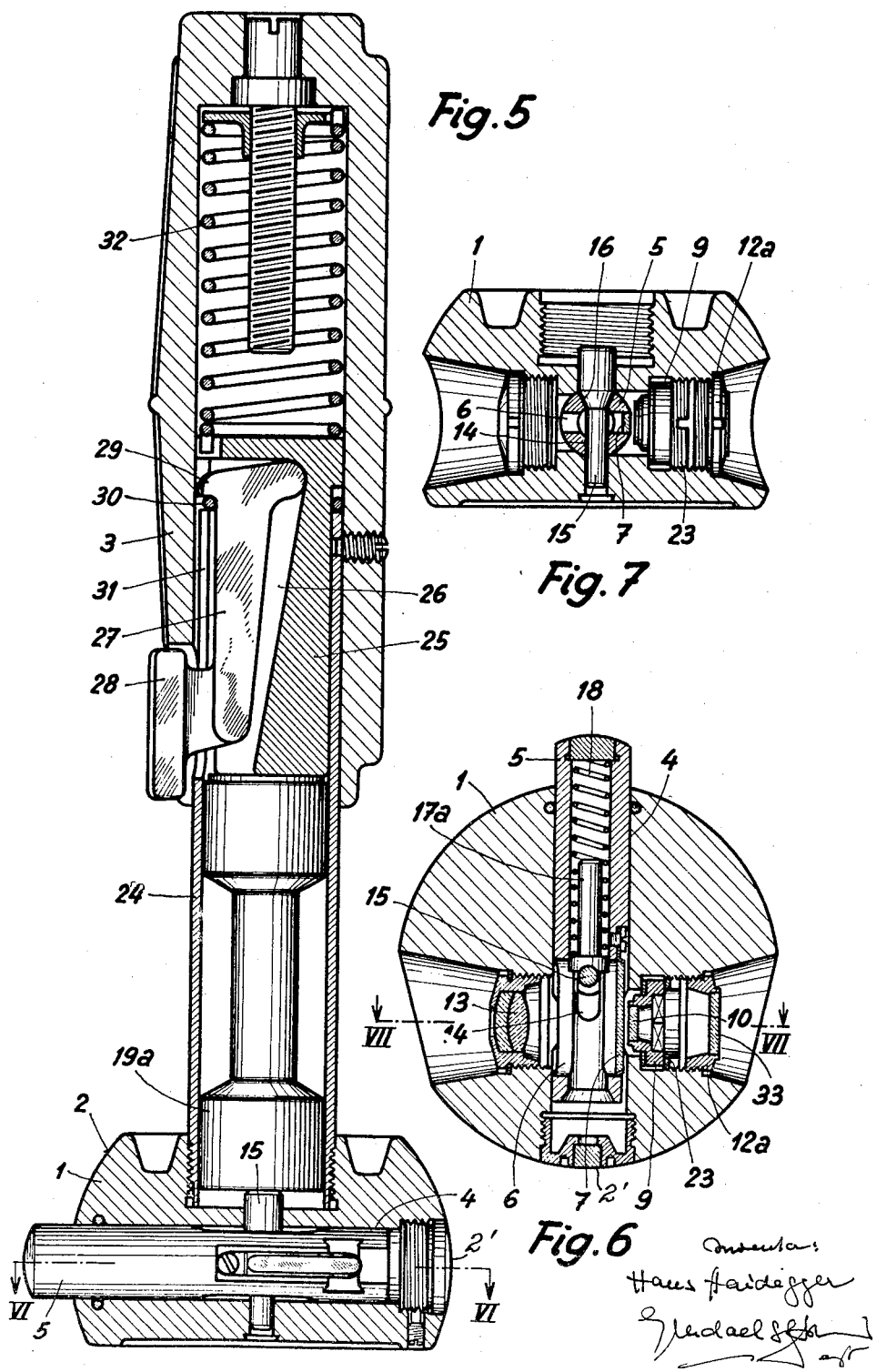

Patented May 15, 1951

2,553,086

UNITED STATES PATENT OFFICE 2,553,086

INSTRUMENT FOR INSIDE MEASUREMENTS

Hans Haidegger, Solothurn, Switzerland, assignor to Ebauches S. A., Grenchen, Solothurn, Switzerland, a joint-stock company of Switzerland Application November 14, 1947, Serial No. 785,882
In Switzerland June 1, 1944

Section 1, Public Law 690, August 8, 1946
Patent expires June 1, 1964

8 Claims. (Cl. 33—143)

The invention relates to an instrument for inside measurements with a head fixed to a handle, which is introduced into the part to be measured and in which a feeler-stud is held and can move.

An object of the invention is to provide the head with a bore normal to the feeler-stud and to provide transparent means in reach of said bore allowing direct reading of the results by looking through said bore.

Other objects and features will be apparent as the following description proceeds, reference being had to the accompanying drawings which, by way of examples, show two embodiments of the invention.

Fig. 1 is an axial section through the first example,

Fig. 2, an axial section through a part of this first embodiment and in an opposite plane at right angles to Fig. 1.

Fig. 3 shows the nonius and

Fig. 4, the scale, both on a much larger scale.

Fig. 5 is an axial section through the second embodiment.

Fig. 6 is a section along line VI—VI in Fig. 5, and

Fig. 7 a section along line VII—VII in Fig. 6.

Figure 3:
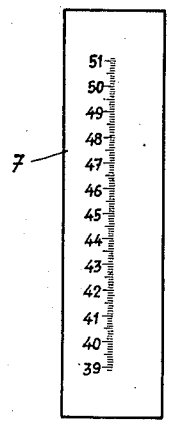
Figure 4:
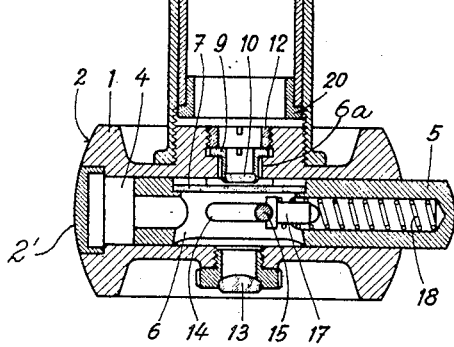
Figures 1, 2:

The head 1 with spherical surface 2 is screwed to the handle 3. The head 1 has on one side a caliper face 2' and oppositely thereto a radial bore 4 which is open at one end and in which the bolt-shaped feeler-stud 5 slides, projecting through the open end thereof. The feeler-stud 5 is slotted as at 6 and carries in this part a transparent scale 7 which is shown separately in Fig. 4 and the graduation of which corresponds to the range of measurement of the instrument. In a setting 9 within the axial bore 6a is fixed a transparent disc 10 with a nonius 11 or an index line. For correct adjustment on assembly, the setting 9 in the head 1 has radial play. It is held fast by means of the hollow nut 12. On the side of the feeler-stud 5 opposite to the disc 10, a magnifying means such as a magnifying lens 13 is fitted. The feeler-stud 5 is held in the definite position taken up during reading by an automatic wedge-brake which includes a pin 15 extending through slots 14 of the feeler-stud having a conical part 16 cooperating with one of the slots 14, which has a conical form. The pin 15 serves at the same time to support the guide-pin 17 of the spring 18 which tends to move the feeler-stud 5 outwards. As shown in Fig. 2, the pin 15 is beveled at one of the ends thereof and remains therewith in contact with a mobile piston 19 being parallel the axis of the handle and extending into the inside of the handle 3.

On the upper end of the piston 19 lies the edge of a thimble 20 which is fixed to a sliding tube 21 inside the handle 3. The tube 21 is closed at the upper end by a transparent cover 22.

If it is desired to measure the inside diameter of a workpiece, the instrument is introduced into the workpiece, with the axis of the handle at an angle to the axis of the bore to be measured and then turned in such a direction as to bring the axis of the stud 5 into a cross-sectional plane of the work-piece to be measured. Owing to the action of the brake-pin 15, the feeler-stud remains in the innermost position thereof. Then the instrument is taken out of the work piece and the magnifying lens 13 is held to the eye looking through the axial bore in the head 1, in which the indicating means 7, 10 and the lens 13 are arranged, in the direction of the transparent cover 22 so that the desired measurement can be read with the aid of the scale and nonius. Afterwards, the end of the tube 21 provided with the cover 22 is pressed against the head 1 whereby the piston 19 presses the pin 15, seen in Fig. 2, to the right. The conical part 16 of the pin 15 disengages the slot 14 so that the spring 18 can bring the feeler-stud 5 into the outermost initial position thereof.

The embodiment shown in Figs. 5 to 7 differs from that shown in Figs. 1–4 in that the results are not read through an axial bore of the head 1 and through the handle, but through a bore of the head 1 extending substantially in radial direction. Here too, the head 1 with spherical surface 2 is screwed to the handle 3 and has a radial bore 4 in which the bolt-shaped feeler-stud 5 is slidably arranged. This stud 5 is slotted as at 6 and carries in this part a transparent scale 7 of the kind shown in Fig. 4. In the setting 9, having radial play for correct adjustment on assembly in the head 1, is fixed a transparent disc 10 with a nonius or an index line. It is clamped fast by means of a hollow nut 23. A hollow nut 12a carries a transparent disc 33. On the side of the stud 5 opposite to the disc 10 a magnifying lens 13 is fixed in the head. Indicating means 7 and 10 and lens 13 are all lying in a bore extending in substantially radial direction through the head 1 normal to the radial bore 4.

The automatic wedge-brake, holding the stud 5 in the definite position taken up after feeling, is as follows: The pin 15 traverses the slots 14 of the feeler-stud 5 and has a conical part 16 (Fig. 7) cooperating for braking with one of the slots 14 which is shaped conically. The pin 15 serves at the same time to support the guide pin 17a of the spring 18 tending to move the stud 5 outwards. As Fig. 5 shows, the pin 15 is in contact with a piston 19a slidably arranged in a tube 24 of the handle 3. In the tube 24 a cock 25 is arranged behind the piston 19a. The cock has a groove 26 engaged by a lever 27 provided with a press button 28, traversing a slot 31 of the tube 24. A nose 29 of the press lever 27 bears against a ring 30 supported on the free end of the tube 24. A spring 32 arranged inside the handle 3 with one end thereof supported on this handle, urges the cock 25 against the piston 19a and, thus, holds the pin 15 in braking position.

If an inside dimension of a workpiece has to be measured, the instrument is introduced and manipulated as described with regard to the first embodiment. The pin 15 first holds the feeler-stud 5 in the definite position. Then the instrument is taken out of the work piece and the magnifying lens 13 is held to the eye looking through the bore of the head 1 in substantially radial direction towards the disc 10. Afterwards, the button 28 is pressed whereby the cock 25 compresses the spring 32 and releases the piston 19a. Thereby, the brake-pin 15 is released, so that the spring 18 can bring the feeler-stud 5 into its outermost initial position. By releasing the button 28, the spring 32 is made to press upon the cock 25 and to bring the pin 15 into braking position by means of the piston 19a.

What I claim is:

1. In an indicating inside caliper, in combination, an elongated handle; a head fixed to said handle at one end thereof and provided with a hole being open at one end and located perpendicularly to said handle and a bore being open at both ends and extending through said head and intersecting said hole, said head having a caliper face on that side of said head which is located opposite said open end of said hole; a feeler stud arranged slidably in said hole projecting at its front end through said open end of said hole and passing through the intersection of said hole with said bore, said feeler stud being shaped so as to form a passage for a light beam at least through a part of said bore at its intersection with said hole; and position indicating means provided at least partly within said head and including an indicating part on said feeler stud arranged within said passage for said light beam passing through said bore, so that said indicating part and changes in the position thereof can be observed by looking through said bore.

2. In an indicating inside caliper, in combination, an elongated handle; a head fixed to said handle at one end thereof and provided with a hole being open at one end and located perpendicularly to said handle and a bore being open at both ends and extending through said head perpendicularly to said hole and intersecting the same, said head having a caliper face on that side of said head which is located opposite said open end of said hole; a feeler stud arranged slidably in said hole projecting at its front end through said open end of said hole and passing through the intersection of said hole with said bore, said feeler stud being shaped so as to form a passage for a light beam at least through a part of said bore at its intersection with said hole; and position indicating means provided at least partly within said head and including an indicating part on said feeler stud arranged within said passage for said light beam passing through said bore, so that said indicating part and changes in the position thereof can be observed by looking through said bore.

3. In an indicating inside caliper, in combination, an elongated handle; a head fixed to said handle at one end thereof and provided with a hole being open at one end and located perpendicularly to said handle and a bore being open at both ends and extending through said head perpendicularly to said hole and intersecting the same, said head having a caliper face on that side of said head which is located opposite said open end of said hole; a feeler stud arranged slidably in said hole projecting at its front end through said open end of said hole and passing through the intersection of said hole with said bore, said feeler stud having an opening permitting passage of a light beam at least through a part of said bore at its intersection with said hole; and position indicating means provided at least partly within said head and including an indicating part on said feeler stud arranged within said opening in such a manner as to be located within the light beam passing through said bore, so that said indicating part and changes in the position thereof can be observed by looking through said bore.

4. In an indicating inside caliper, in combination, an elongated handle; a head fixed to said handle at one end thereof and provided with a hole being open at one end and located perpendicularly to said handle and a bore being open at both ends and extending through said head perpendicularly to said hole and intersecting the same, said head having a caliper face on that side of said head which is located opposite said open end of said hole; a feeler stud arranged slidably in said hole projecting at its front end through said open end of said hole and passing through the intersection of said hole with said bore, said feeler stud having an opening permitting passage of a light beam at least through a part of said bore at its intersection with said hole; and position indicating means provided at least partly within said head and including a transparent indicating member in said feeler stud arranged wtihin said opening in such a manner as to be located within the light beam passing through said bore, so that said indicating part and changes in the position thereof can be observed by looking through said bore.

5. In an indicating inside caliper, in combination, an elongated handle; a head fixed to said handle at one end thereof and provided with a hole being open at one end and located perpendicularly to said handle and a bore being open at both ends and extending through said head perpendicularly to said hole and intersecting the same, said head having a caliper face on that side of said head which is located opposite said open end of said hole; a feeler stud arranged slidably in said hole projecting at its front end through said open end of said hole and passing through the intersection of said hole with said bore, said feeler stud having an opening permitting passage of a light beam at least through a part of said bore at its intersection with said hole; position indicating means provided at least partly within said head and including a transparent indicating member in said feeler stud arranged within said opening in such a manner as to be located within the light beam passing through said bore, so that said indicating part and changes in the position thereof can be observed by looking through said bore; and a lens in said bore for magnifying said transparent member in said opening in said feeler stud.

6. In an indicating inside caliper, in combination, a handle; a head fixed to said handle and provided with a hole and a bore extending through said head and intersecting said hole; a feeler stud arranged slidably in said hole passing through the intersection thereof with said bore, said feeler stud being shaped so as to permit passage of light at least through a part of said bore at its intersection with said hole; position indicating means provided at least partly within said head and including an indicating part on said feeler stud arranged within the intersection of said hole and said bore so that said indicating part and changes in the position thereof can be observed by looking through said bore; spring means permanently tending to slide said feeler stud in said hole in outward direction; locking means permanently tending to lock said feeler stud in its position in said hole; and manually operable releasing means for releasing said locking means, thereby permitting said feeler stud to slide under action of said spring means in outward direction.

7. In an instrument for inside measurement, a handle, a head fixed to said handle and provided with a radial hole, a feeler stud comprising a wedge portion, slidably arranged in said radial hole, a spring supported on said feeler stud to urge the latter outwardly along said radial hole, a wedge slidably guided in said head, a spring supported on said wedge to press the latter onto said wedge portion to hold said feeler stud in test position against the constraint of said first-mentioned spring, wedge-releasing means movably mounted in said handle and coupled with said wedge to temporarily release said feeler stud to allow the latter to be urged outwardly by said first-mentioned spring, said head having a bore open at both ends thereof and intersecting said radial hole, and transparent test indicating means comprising parts mounted in said head and visible through said bore and parts mounted on said feeler stud to be visible through said bore.

8. In an instrument for inside measurement, a handle, a head fixed to said handle and provided with a radial hole, a feeler stud comprising a wedge portion, slidably arranged in said radial hole, a spring supported on said feeler stud to urge the latter outwardly along said radial hole, a wedge slidably guided in said head, a spring supported on said wedge to press the latter onto said wedge portion to hold said feeler stud in test position against the constraint of said first-mentioned spring, wedge-releasing means movably mounted in said handle and coupled with said wedge to temporarily release said feeler stud to allow the latter to be urged outwardly by said first-mentioned spring, said head having a bore open at both ends thereof and intersecting said radial hole, transparent test indicating means comprising parts mounted in said head and visible through said bore and parts mounted on said feeler stud to be visible through said bore, and optical magnifying means mounted on said head in alignment with said bore.

HANS HAIDEGGER.

REFERENCES CITED

The following references are of record in the file of this patent:

UNITED STATES PATENTS

| Number | Name | Date |
|---|---|---|
| 1,141,396 | Jubinville | June 1, 1915 |
| 1,431,613 | Wittner | Oct. 10, 1922 |
| 1,439,989 | Avander et al. | Dec. 26, 1922 |
| 1,775,952 | Turrettini | Sept. 16, 1930 |
| 2,010,301 | Helfer | Aug. 6, 1935 |
| 2,223,182 | Muller | Nov. 26, 1940 |
| 2,227,883 | Grobe | Jan. 7, 1941 |

FOREIGN PATENTS

| Number | Country | Date |
|---|---|---|
| 68,847 | Switzerland | July 1, 1914 |

OTHER REFERENCES

Publ.: "Microtecnic" Aug. 1947, Swiss, vol. 1, No. 4, pp. 189–191.